United States Patent [19]
Sato

[11] Patent Number: 5,412,507
[45] Date of Patent: May 2, 1995

[54] GREAT APERTURE ZOOM LENS

[75] Inventor: Haruo Sato, Kawasaki, Japan

[73] Assignee: Nikon Corporation, Tokyo, Japan

[21] Appl. No.: 277,946

[22] Filed: Jul. 19, 1994

Related U.S. Application Data

[63] Continuation of Ser. No. 73,710, Jun. 9, 1993, abandoned.

[30] Foreign Application Priority Data

Jun. 17, 1992 [JP] Japan .................................. 4-158055

[51] Int. Cl.6 .............................................. G02B 15/00
[52] U.S. Cl. ..................................... 359/687; 359/688;
359/689; 359/695; 359/733; 359/754; 359/771;
359/745
[58] Field of Search .............. 359/687, 686, 688, 689,
359/695, 733, 745, 754, 771; 350/427, 453

[56] References Cited

U.S. PATENT DOCUMENTS

| | | | |
|---|---|---|---|
| 3,584,935 | 6/1971 | Kojima | 350/184 |
| 4,460,251 | 7/1984 | Okudaira | 350/427 |
| 5,144,488 | 9/1992 | Endo et al. | 359/686 |
| 5,225,937 | 7/1993 | Horiuchi | 359/688 |
| 5,267,084 | 11/1993 | Nozawa | 359/689 |

*Primary Examiner*—Viet Q. Nguyen
*Attorney, Agent, or Firm*—Shapiro and Shapiro

[57] ABSTRACT

A great aperture zoom lens has, in succession from the object side, a first lens unit having positive refractive power, a second lens unit having negative refractive power, a third lens unit having positive refractive power, and a fourth lens unit having positive refractive power. The second lens unit has, in succession from the object side, a negative lens component, a negative lens component, a positive lens component and a negative lens component. In case of the magnification change from the wide angle end to the telephoto end, the first lens unit, the third lens unit and the fourth lens unit are moved toward the object side. The zoom lens satisfies various predetermined conditions.

25 Claims, 6 Drawing Sheets

FIG. 2A WIDE f=36mm
FIG. 2B MIDDLE f=60mm
FIG. 2C TELE f=102mm

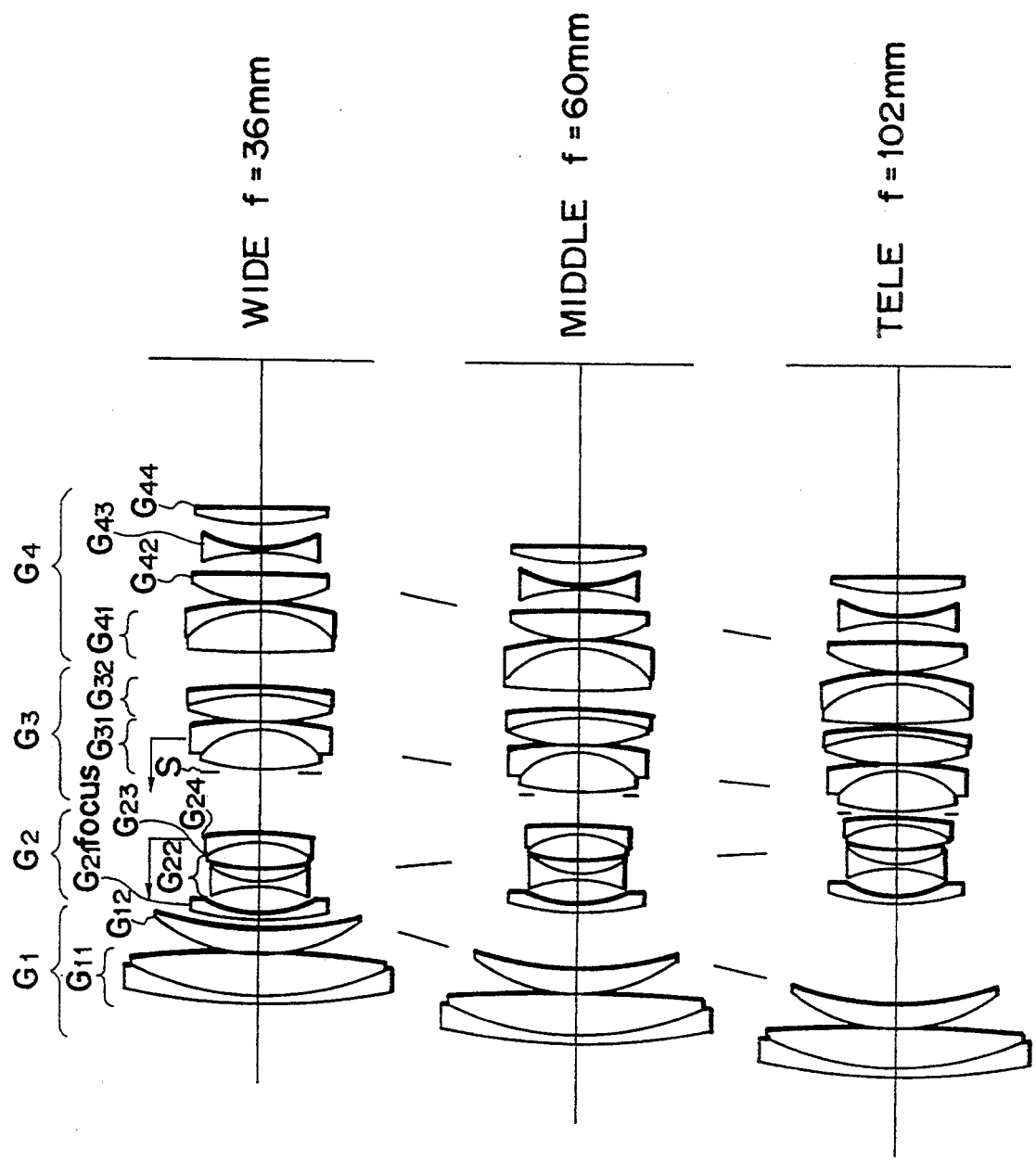

GREAT APERTURE ZOOM LENS

This is a continuation of application Ser. No. 08/073,710, filed Jun. 9, 1993, now abandoned.

BACKGROUND OF THE INVENTION

1. Field of the Invention

This invention relates to a zoom lens, and particularly to a great aperture zoom lens in which a maximum angle of view includes a wide angle of view exceeding 60° and which has a relatively wide magnification change range from the wide angle to the telephoto and is as bright as the order of F2.8.

2. Related Background Art

For example, U.S. Pat. No. 3,584,935 is known as a zoom lens of which the zoom magnification change ratio is of the order of three times and which has a wide angle end at one end of the magnification change range and in which F number is of the order of F2.8 and which has realized a great relative aperture. In zoom lenses, focusing is generally done by the so-called fore lens axial movement system, but U.S. Pat. No. 5,144,488, U.S. Pat. No. 4,460,251, etc. describe zoom lenses in which other focusing systems are adopted.

The zoom lens proposed in the aforementioned U.S. Pat. No. 3,584,935 is a zoom lens of four-unit construction comprising positive, negative, positive and positive lens units which is basically similar to the present invention, and has a great relative aperture in which fully open F number is as bright as the order of F2.8. However, this conventional zoom lens cannot be said to be sufficient in aberration correction, and is insufficient particularly in the correction of the fluctuation of downward coma by magnification change and distortion, and it has a large fore lens diameter, which is not preferable.

Also, as a focusing system, a zoom lens of four-unit lens construction comprising positive, negative, positive and negative lens units in which focusing is effected by only the second lens unit is disclosed, for example, in U.S. Pat. No. 5,144,488. In this zoom lens, however, fully open F number is as dark as F4–5.6, and in such a zoom lens, it is difficult to realize a great aperture zoom lens of the order of F2.8. Further, in the focusing system by the movement of only the second lens unit, aberration fluctuation is great, and particularly the fluctuations of spherical aberration and curvature of image field on the telephoto side are great, and this is not preferable. Accordingly, it is difficult to use this focusing system in a zoom lens having a greater relative aperture of the order of F2.8, and in terms of performance as well, remarkable deterioration of the short distance performance particularly on the telephoto side is brought about, and this is not preferable.

U.S. Pat. No. 4,460,251 discloses a zoom lens in which a second lens unit, a third lens unit and a part of a fourth lens unit are moved as a unit to thereby effect focusing. This zoom lens, however, is a zoom lens of four-unit construction comprising positive, negative, negative and positive lens units and therefore, differs in basic construction from the zoom lens of four-unit construction comprising positive, negative, positive and positive lens units. In addition, in this zoom lens, the image circle is remarkably small and the back focal length is also remarkably small and moreover, many lens units need be moved for focusing. For example, it is necessary to separate the fourth lens unit into two portions and move one of the two portions during focusing and therefore, mechanical structure becomes complicated and thus, this zoom lens becomes substantially equivalent to a zoom lens of five-unit construction, and this is not preferable. Also, the second and third lens units and a part of the fourth lens are all moved as a unit for focusing and therefore, the fluctuations of aberrations such as coma and curvature of image field are great, and this has not been preferable.

SUMMARY OF THE INVENTION

Accordingly, it is an object of the present invention to solve the above-noted problems and to provide a zoom lens in which the zoom magnification change ratio is of the order of three times and which has F number of the order of F2.8 and yet has a good optical performance and which is high in performance and bright.

To achieve the above object, a zoom lens according to the present invention has, in succession from the object side, a first lens unit having positive refractive power, a second lens unit having negative refractive power, a third lens unit having positive refractive power, and a fourth lens unit having positive refractive power, said second lens unit comprising, in succession from the object side, a negative lens component, a negative lens component, a positive lens component and a negative lens component, and during the magnification change from the wide angle end to the telephoto end, said second lens unit being moved toward the image side and said first lens unit, said third lens unit and said fourth lens unit being moved toward the object side, and is designed to satisfy the following conditions:

$$-3 \leq f_{G2} \cdot h_{G2R}/f_T \leq -1.5$$

$$6 \leq f_{G3} \cdot h_{G3R}/f_T \leq 14$$

$$6 \leq f_{G4} \cdot h_{G4F}/f_T \leq 16,$$

where $f_{G2}$: the focal length of the second lens unit;

$f_{G3}$: the focal length of the third lens unit;

$f_{G4}$: the focal length of the fourth lens unit;

$h_{G2R}$: the height of rays at the telephoto end from a position at which Rand rays, being rays determining the F number and being rays from the on-axis infinity object point, pass through the outermost margin of a lens surface of the second lens unit which is most adjacent to the image side, to the optical axis;

$h_{G3R}$: the height of rays at the telephoto end from a position at which the Rand rays, being rays determining the F number and being rays from the on-axis infinity object point, pass through the outermost margin of a lens surface of the third lens unit which is most adjacent to the image side, to the optical axis;

$h_{G4F}$: the height of rays at the telephoto end from a position at which the Rand rays, being rays determining the F number and being rays from the on-axis infinity object point, pass through the outermost margin of a lens surface of the fourth lens unit which is most adjacent to the object side, to the optical axis;

$f_T$: the focal length of the whole system at the telephoto end.

Also, it is desirable that during the focusing to a short distance object point, the second lens unit and at least one other lens unit be moved to thereby effect focusing, and that the design be such that the following condition is satisfied:

$$0 < |X_n/X_2| \leq 0.9,$$

where $X_2$: the amount of movement of the second lens unit during short distance focusing;

$X_n$: the amount of movement of the nth lens unit (n represents any lens unit other than the second lens unit) during short distance focusing.

As described above, according to the present invention, there is achieved a zoom lens of high magnification and great aperture, in which each lens unit is comprised of the fewest possible lens components and the diameter of the fore lens is small, and which is constructed compactly, and yet in which F number is as bright as 2.8, and moreover the zoom ratio amounts to even the order of three times, and which has an excellent imaging performance over the wide angle end to the telephoto end.

Other objects, features and effects of the present invention will become fully apparent from the following detailed description taken in conjunction with the accompanying drawings.

BRIEF DESCRIPTION OF THE DRAWINGS

FIGS. 6A-6C are illustrations showing the movement states of respective lens units in the third embodiment shown in FIG. 5 during magnification change and focusing.

DESCRIPTION OF THE PREFERRED EMBODIMENTS

Some embodiments of the present invention will hereinafter be described in detail with reference to the accompanying drawings.

Figure 1:
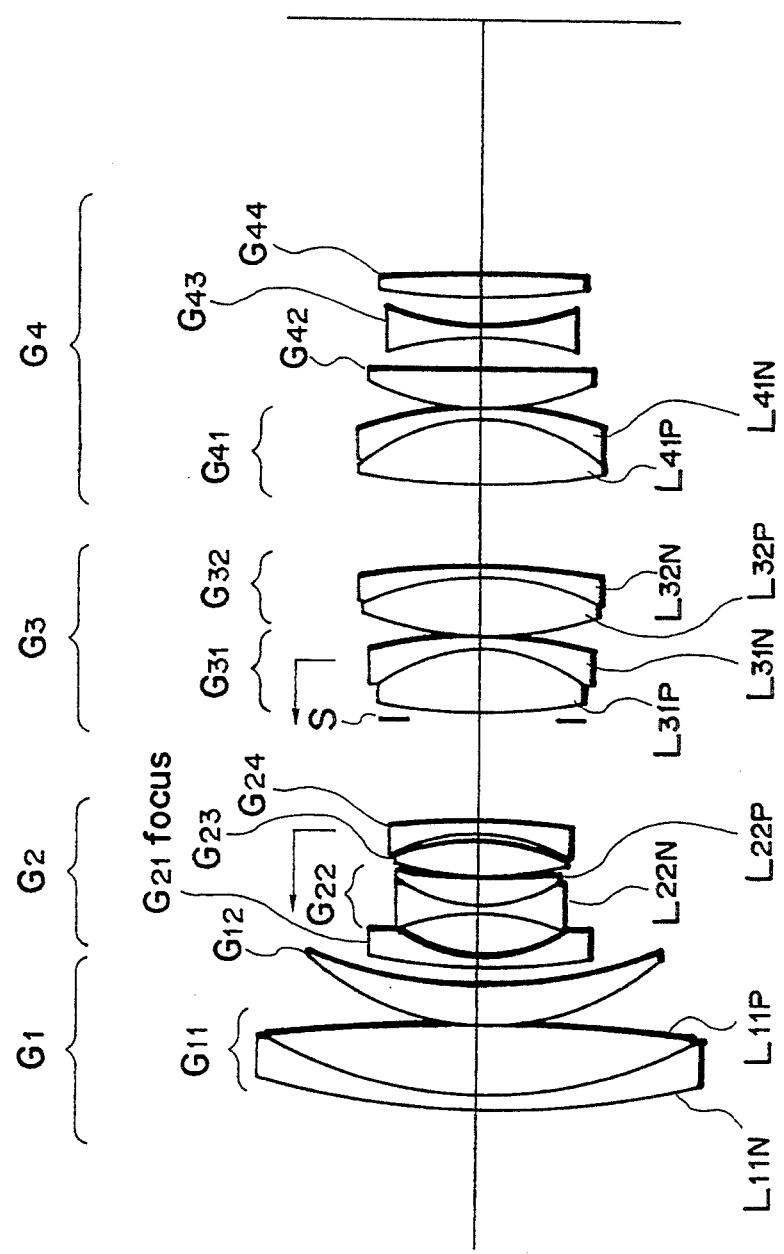
FIG. 1 shows the lens construction of a first embodiment of the present invention.
Figure 2:
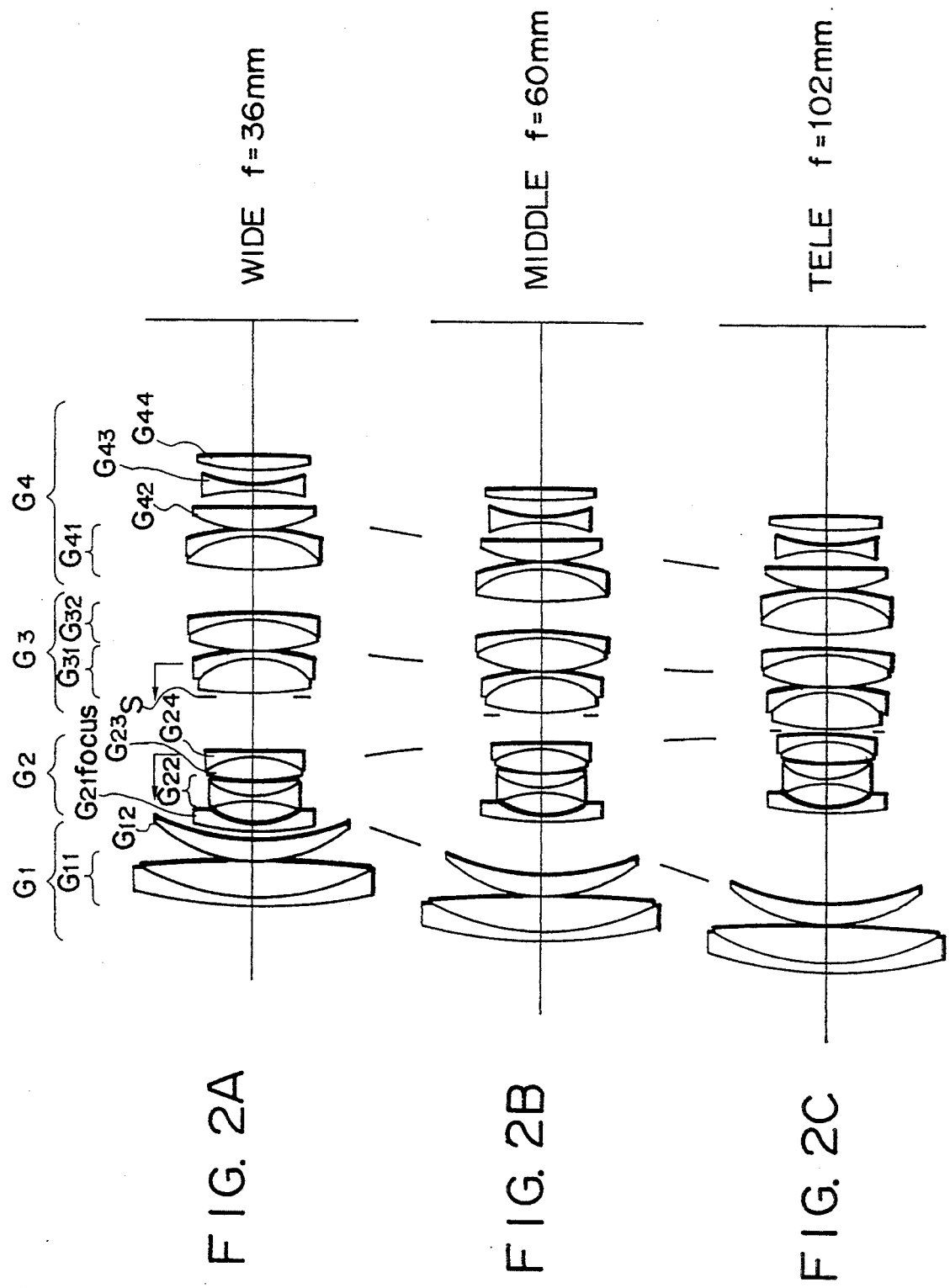
FIGS. 2A-2C are illustrations showing the movement states of respective lens units in the first embodiment shown in FIG. 1 during magnification change and focusing.
Figure 3:
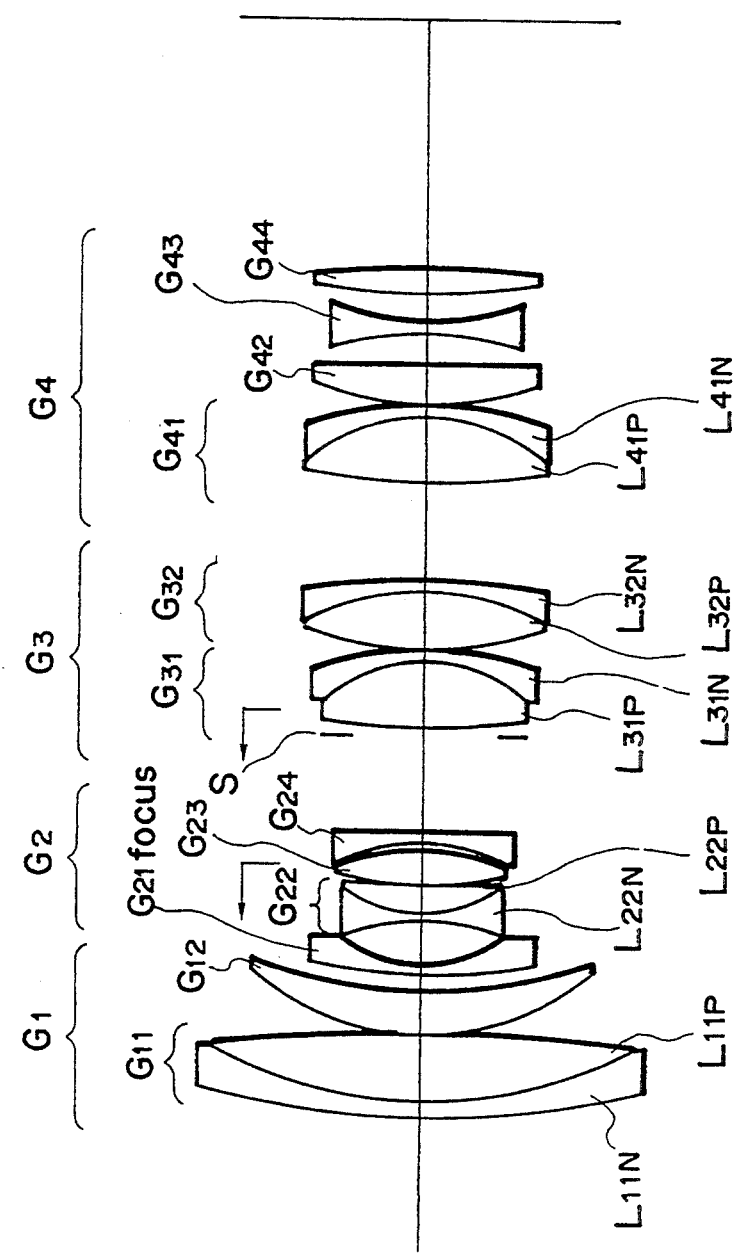
FIG. 3 shows the lens construction of a second embodiment of the present invention.
Figure 4:
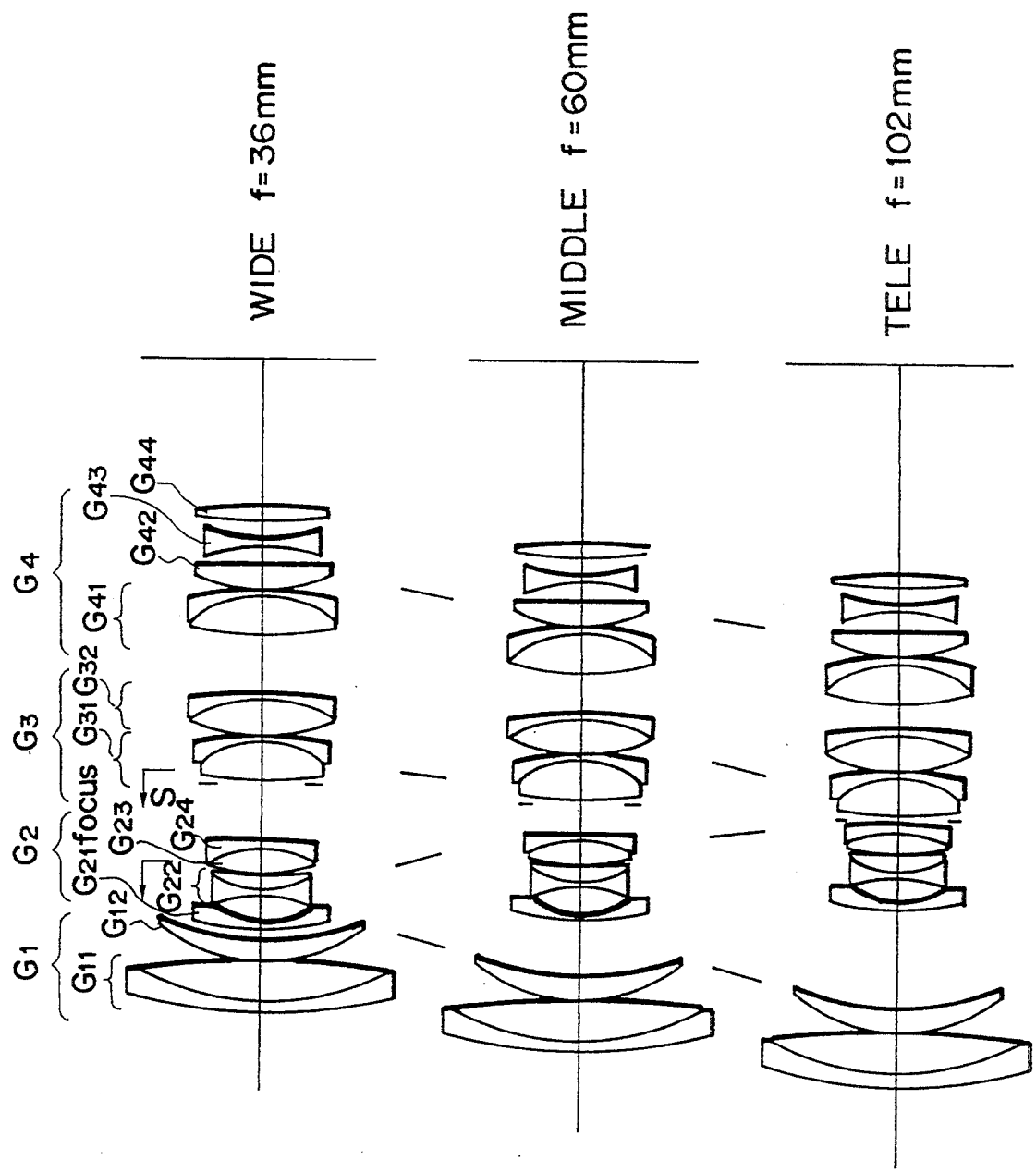
FIGS. 4A-4C are illustrations showing the movement states of respective lens units in the second embodiment shown in FIG. 3 during magnification change and focusing.
Figure 5:
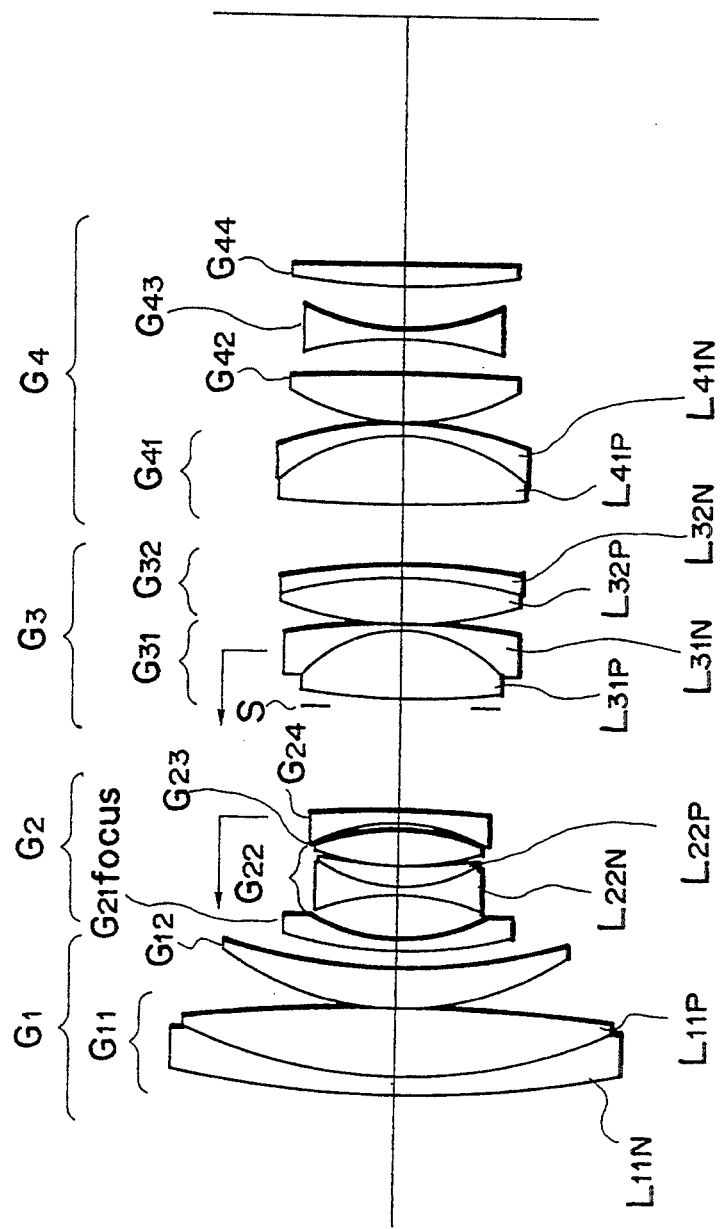
FIG. 5 shows the lens construction of a third embodiment of the present invention.

FIGS. 1, 3 and 5 show the lens constructions of a first embodiment, a second embodiment and a third embodiment, respectively, of the present invention, and FIGS. 2A-2C, 4A-4C and 6A-6C show the movement states of respective lens units in the embodiments shown in FIGS. 1, 3 and 5, respectively, during magnification change and focusing.

Any of zoom lenses according to the embodiments of the present invention, as shown in FIG. 1, comprises four lens units including, in succession from the object side, a first lens unit G1 having positive refractive power, a second lens unit G2 having negative refractive power, a third lens unit G3 having positive refractive power, and a fourth lens unit G4 having positive refractive power, and the second lens unit G2 has, in succession from the object side, a negative lens component G21, a negative lens component G22, a positive lens component G23 and a negative lens component G24, and the design is such that during the magnification change from the wide angle end to the telephoto end, the second lens unit G2 is moved toward the image side and the first lens unit G1, the third lens unit G3 and the fourth lens unit G4 are moved toward the object side. Further, when the focal length of the whole system at the telephoto end is $f_T$, the second lens unit G2, the third lens unit G3 and the fourth lens unit G4 are designed to satisfy the following conditions:

$$-3 \leq f_{G2} \cdot h_{G2R}/f_T \leq -1.5 \tag{1}$$

$$6 \leq f_{G3} \cdot h_{G3R}/f_T \leq 14 \tag{2}$$

$$6 \leq f_{G4} \cdot h_{G4F}/f_T \leq 16, \tag{3}$$

where $f_{G2}$: the focal length of the second lens unit G2;

$f_{G3}$: the focal length of the third lens unit G3;

$f_{G4}$: the focal length of the fourth lens unit G4;

$h_{G2R}$: the height of rays at the telephoto end from a position at which Rand rays, being rays determining the F number and being rays from the on-axis infinity object point, pass through the outermost margin of a lens surface of the second lens unit G2 which is most adjacent to the image side, to the optical axis;

$h_{G3R}$: the height of rays at the telephoto end from a position at which the Rand rays, being rays determining the F number and being rays from the on-axis infinity object point, pass through the outermost margin of a lens surface of the third lens unit G3 which is most adjacent to the image side, to the optical axis;

$h_{G4F}$: the height of rays at the telephoto end from a position at which the Rand rays, being rays determining the F number and being rays from the on-axis infinity object point, pass through the outermost margin of a lens surface of the fourth lens unit G4 which is most adjacent to the object side, to the optical axis.

Now, generally in standard zoom lenses having a four-unit construction comprising positive, negative, positive and positive lens units and particularly having a magnification change ratio of the order of three times, the mainstream is a zoom lens in which fully open F number is of the order of F3.5-F5.6, and lenses in which fully open F number is of the order of F2.8 in the whole magnification change area, as in the embodiments of the present invention, have scarcely been proposed. The negative second lens unit of the zoom lens of this type has played a great role for the correction of off-axis aberrations chiefly at the wide angle end.

However, if such conventional zoom lens is intactly made to have a great relative aperture, the burden not only for the off-axis aberrations on the wide angle side but also for the on-axis aberrations on the telephoto side will become great. Particularly, the correction of spherical aberration and downward coma on the telephoto side will become more difficult and the burden of the negative second lens unit for the correction of aberrations will increase. Accordingly, if in the degree of freedom of the aberration correction of the negative second lens unit, the burden particularly for spherical aberration and downward coma at the telephoto end is increased, the correction of aberrations such as distortion, curvature of image field and astigmatism on the wide angle side will become insufficient.

So, in the present embodiment, the optimum construction and refractive power arrangement of the second lens unit G2 have been discovered to overcame these problems.

That is, the second lens unit G2 in the present invention is of a simple lens construction having, in succession from the object side, a negative first lens component G21, a negative second lense component G22, a positive third lens component G23 and a negative fourth lens component G24 and is constructed into an optimum refractive power arrangement and therefore, it makes it possible to correct astigmatism, curvature of image field, downward coma and distortion well at the wide angle end and yet correct spherical aberration and downward coma well at the telephoto end.

Also, to correct spherical aberration well over the entire magnification change area and to effect the correction of upward coma and the correction or the like of distortion at the telephoto end well, the optimum refractive power arrangement not only of this second lens unit G2 but also of the third lens unit G3 and the fourth lens unit G4 becomes very important.

Further, generally to realize a great aperture zoom lens, it is necessary that the height h, from the optical axis, of rays which are rays determining fully open F number and which are rays of parallel light from the on-axis infinity object point entering the lens and passing through the highest position of each lens unit (hereinafter referred to as the "Rand rays") be made greater. The greater becomes the height h of the Rand rays from the optical axis, through the more marginal portions of the lenses in each lens unit the rays pass and therefore, an optimum refractive power arrangement becomes necessary for correcting aberrations.

For example, if a lens unit having negative refractive power is the last lens unit, to secure the same F number, the height h, from the optical axis, of the Rand rays passing through the lens unit ahead of that last lens unit becomes remarkably great,'and this is disadvantageous for the correction of spherical aberration. Accordingly, for the reason set forth above, a lens unit having positive refractive power is advantageous as the last lens unit of a lens system.

So, in the present invention, optimum conditional expressions (1)-(3) regarding the height h, from the optical axis, of the Rand rays passing through the highest position of each lens in the second to fourth lens units and the refractive powers of the lens units have been discovered. The above-mentioned conditional expressions (1)-(3) will hereinafter be described.

Conditional expression (1) shows an optimum condition regarding the refractive power of the second lens unit G2 and the height of the Rand rays from the optical axis.

If the lower limit of conditional expression (1) is exceeded, the negative focal length of the second lens unit G2 in a lens having a predetermined relative aperture will become remarkably great as compared with the focal length of the whole system and the amount of movement of the second lens unit G2 during magnification change will become remarkably great. Therefore, if an attempt is made to obtain a desired magnification change ratio, mechanical interference will be brought about, and if an attempt is made to secure the variable air gaps before and behind the second lens unit sufficiently, it will become difficult to make the whole lens system compact.

If conversely, the upper limit of conditional expression (1) is exceeded, the negative focal length $f_{G2}$ of the second lens unit G2 will become remarkably small as compared with the focal length $f_T$ of the whole system. Therefore, due particularly to the deficiency of the degree of freedom in aberration correction, it will become impossible to correct spherical aberration on the telephoto side sufficiently and the fluctuation of spherical aberration by magnification change will become great. So, if for example, an attempt is made to correct this spherical aberration well, the degree of freedom in the correction of the aberrations other than spherical aberration will become deficient and therefore, conversely, the correction of downward coma, astigmatism and curvature of image field will become difficult. Further, the negative refractive power of the second lens unit will become strong, whereby the value of Petzval sum will tend to become remarkably small and therefore, curvature of image field and astigmatism will be aggravated. Accordingly, to correct the fluctuations of these aberrations, the number of lens components constituting the lens will have to be increased with a result that the lens system becomes bulky.

On the other hand, where for example, the focal length $f_{G2}$ of the second lens unit G2 is constant, if the height $h_{G2R}$ of the rays from a position at which the Rand rays pass through the outermost margin of a lens surface of the second lens unit G2 which is most adjacent to the image side, to the optical axis, becomes remarkably great and departs from conditional expression (1), it means that for this focal length $f_{G2}$, the degree of freedom in aberration correction great enough to have the height $h_{G2R}$ of the rays will become deficient, and thus, the degree of freedom in aberration correction great enough for the lens system to have a satisfactory relative aperture will become deficient. Particularly, the fluctuations of downward coma and spherical aberration will become great and the correction of spherical aberration, etc. on the telephoto side will become difficult, and it will become impossible to achieve a good great aperture zoom lens.

If the upper limit value of conditional expression (1) is $-1.8$, the correction of aberrations such as spherical aberration will become better and a great aperture zoom lens of higher performance can be achieved.

Conditional expression (2) shows an optimum condition regarding the refractive power of the third lens unit G3 and the height of the Rand rays from the optical axis.

If the lower limit of conditional expression (2) is exceeded, the focal length $f_{G3}$ of the third lens unit G3 in a lens having a predetermined relative aperture will become remarkably small as compared with the focal length $f_T$ of the whole system and therefore, the fluctuation of spherical aberration by magnification change will become remarkably great. Thus, the correction of spherical aberration particularly on the telephoto side will become difficult. If in this state, spherical aberration is corrected, the number of lens components constituting the third lens unit G3 will have to be remarkably increased with a result that the complication and bulkiness of the third lens unit G3 are brought about, and this is not preferable.

If conversely, the upper limit of conditional expression (2) is exceeded, the focal length $f_{G3}$ of the third lens unit G3 will become remarkably great as compared with the focal length $f_T$ of the whole system, and this is advantageous for correcting various aberrations, but not only the bulkiness (thickening) of the third lens unit G3 will be brought about, but also the amount of movement of the third lens unit G3 by magnification change will become great and as a result, the whole system will become bulky, and this i s not preferable.

On the other hand, where for example, the focal length $f_{G3}$ of the third lens unit G3 is constant, if the value of the height $h_{G3R}$ of the rays from a position at which the Rand rays pass through the outermost margin of a lens surface of the third lens unit G3 which is most adjacent to the image side, to the optical axis, becomes remarkably great and departs from conditional expression (2), the degree of freedom of aberration correction great enough to have that value of the height $h_{G3R}$ will become deficient for the value of the focal length $f_{G3}$ of the third lens unit G3 and the correction of spherical aberration particularly on the telephoto side will become difficult, and it will become impossible to achieve a good great aperture zoom lens.

If the lower limit value of conditional expression (2) is 8.6, the degree of freedom of aberration correction will further increase and particularly, the correction of spherical aberration will become better, and a great aperture zoom lens of higher performance can be achieved.

Conditional expression (3) shows an optimum condition regarding the refractive power of the fourth lens unit G4 and the height of the Rand rays from the optical axis.

If the lower limit of conditional expression (3) is exceeded, the focal length $f_{G4}$ of the fourth lens unit G4 in a lens having a predetermined relative aperture will become remarkably short as compared with the focal length $f_T$ of the whole system. Particularly, in the case of a bright zoom lens, the degree of freedom with which various aberrations are corrected will be remarkably reduced and the fluctuation of upward coma particularly on the wide angle side and the fluctuations of upward coma, curvature of image field and astigmatism by magnification change will be remarkable, and spherical aberration at the telephoto end will also be aggravated. If aberration correction is effected in such a state, the complication and bulkiness of the fourth lens unit G4 will be brought about, and this is not preferable.

If conversely, the upper limit of conditional expression (3) is exceeded, the focal length $f_{G4}$ of the fourth lens unit G4 will become remarkably long as compared with the focal length $f_T$ of the whole system. Therefore, the diameter of the image side rear lens of the fourth lens unit G4 will become remarkably large, thus resulting in the bulkiness of the fourth lens unit G4, and further the amount of movement of the fourth lens unit G4 for magnification change will become great with a result that the whole system becomes bulky, and this is not preferable.

On the other hand, where for example, the focal length $f_{G4}$ of the fourth lens unit G4 is made constant, if the value of the height $h_{G4F}$ of the rays from a position at which the Rand rays pass through the outermost margin of a lens surface of the fourth lens unit G4 which is most adjacent to the object side, to the optical axis, becomes remarkably great and does not satisfy conditional expression (3), the degree of freedom in aberration correction having a value of the height $h_{G4F}$ of the Rand rays at this focal length $f_{G4}$, i.e., a satisfactory relative aperture, will be deficient. Particularly, the fluctuation of upward coma will become great and the correction of spherical aberration will become difficult, and it will become impossible to achieve a good great aperture zoom lens.

To make the lens system more compact and obtain an excellent imaging performance, it is desirable that the lower limit value and upper limit value of conditional expression (3) be 8 and 12, respectively, and this range be satisfied.

Now, generally, a great aperture lens is very great in the deterioration of performance by focusing as compared with a lens of small relative aperture and therefore, numerous focusing systems for suppressing the deterioration of the performance thereof have been proposed. In a zoom lens like that of the present invention, as in popular great aperture lenses, it has been necessary to consider a focusing system for sufficiently suppressing the deterioration of performance during focusing. For example, when the lens according to the present invention is to be focused by the fore lens axial movement system as is conventional, focusing is possible. However, to realize a zoom lens of high performance in which the fluctuations of aberrations during shorter distance photographing are small, it is desirable to adopt a focusing system having a so-called floating mechanism in which as in the present invention, focusing is effected chiefly by the second lens unit G2 and the fluctuations of aberrations created with this focusing, particularly the fluctuation of curvature of image field and the fluctuation of spherical aberration at the telephoto end, are corrected by the use of one lens unit other than the second lens unit G2. By this focusing system, it becomes possible to suppress the fluctuations of aberrations well to a close distance.

In such case, when one movable lens unit for focusing other than the second lens unit G2 is defined as the nth lens unit and the amount of movement of the second lens unit G2 during short distance focusing is $X_2$ and the amount of movement of the nth lens unit is $X_n$, it is desirable that the second lens unit G2 and the nth lens unit moved for focusing be designed to satisfy the following condition:

$$0 < |X_n/X_2| \leq 0.9 \qquad (4)$$

Conditional expression (4) prescribes the ratio between the amounts of movement of the lens units moved for focusing in the focusing system of the present invention. If the lower limit of conditional expression (4) is exceeded, that is, the ratio is 0 (zero), focusing will be effected by the second lens unit G2 alone and the fluctuations of spherical aberration and curvature of image field particularly at the telephoto end during short distance focusing will become great, and this is not preferable. As a result, this focusing will basically make no great difference in aberration correction from the focusing by the conventional fore lens axial movement system and it will become impossible to achieve a good great aperture zoom lens.

If conversely, the upper limit of conditional expression (4) is exceeded, for example, if the directions in which the two lens units are moved are the same, the amounts of movement of the two lens units moved for focusing will become substantially equal and the effect of floating will decrease, and the balance between the fluctuations of spherical aberration and curvature of image field will become bad and therefore, a good short distance performance will become unobtainable. Further, if for example, a combination of the second lens unit G2 and the third lens unit G3 or the second unit G2 and the fourth lens unit G4 is moved in the same direction to effect focusing, a remarkable increase in the amount of movement will result and the bulkiness of the whole lens system will be brought about, and this is not preferable.

If the upper limit of conditional expression (4) is 0.6, there can be achieved a great aperture zoom lens which will suffer less from a short distance fluctuation.

Now, to enhance the imaging performance during short distance focusing, it is also necessary to suppress the fluctuations of aberrations during focusing too small amount, but it is most important to keep the balance between residual aberrations good, and particularly keep the balance between the fluctuations of spherical aberration and curvature of image field, whereby there is obtained a uniform depicting performance of the whole image field.

The ratio between the amounts of movement of the lens units during focusing defined by conditional expression (4) has a certain width of good image like the depth focus, and if the floating system is used within the range of that width of good image, it will be possible to obtain a relatively good performance. Accordingly, if an optimum ratio between the amounts of movement at each of the wide angle end, the middle focal length state and the telephoto end is set, a finer improvement in the depicting performance can be achieved. For example, at any focal length, the floating mechanism is necessary within the range of the width of good image and a part of the lens system may be focused by the second lens unit G2 alone. Also, in this case, if the floating system is used so as to satisfy conditional expression (4) particularly at the telephoto end, there can be achieved a great aperture zoom lens of high performance which will suffer little from the fluctuations of aberrations during short distance focusing.

Also, if as in the embodiments of the present invention, the design is such that focusing is effected by the second lens unit G2 and the third lens unit G3 and conditional expression (4) is satisfied, there will be provided an internal focusing system in which a better performance is obtained, and the variation in full length by focusing will become null and therefore, mechanical strength will increase and a structural advantage will be obtained.

Further, to achieve a great relative aperture and compactness by constructing the second lens unit G2 of a small number of lens components and yet obtain an excellent imaging performance in all magnification change areas, it is effective to provide an aspherical surface in the second lens unit G2. As a result, it becomes possible to markedly improve the degree of freedom of the correction of the fluctuations of off-axis aberrations, particularly curvature of image field, distortion and downward coma, by magnification change. Also, in the case of a great aperture zoom lens like that of the presention, to sufficiently correct distortion particularly at the wide angle end, it is desirable to introduce an aspherical surface and further, it is more desirable to satisfy the following conditional expression (5):

$$0.001 \leq |AS-S|/f_W \leq 0.03, \tag{5}$$

where $f_W$: the focal length of the whole system at the wide angle end;

$AS-S$: the difference, in the direction of the optical axis at the outermost periphery of the effective diameter, between the aspherical surface and a reference spherical surface having a predetermined radius of vertex curvature.

Conditional expression (5) is a condition regarding the effect of the aspherical surface in the second lens unit G2, and this aspherical surface not only effectively functions for the correction of downward coma particularly at the wide angle end and the fluctuation of downward coma by magnification change and spherical aberration on the telephoto end, but also is very effective to sufficiently correct distortion particularly at the wide angle end as previously described. Thus, conditional expression (5) prescribes the optimum shape of the aspherical surface for obtaining such correcting effect sufficiently.

If the lower limit of conditional expression (5) is exceeded, in the case of a great aperture zoom lens like that of the present invention, the effect of the aspherical surface will be remarkably reduced and the correcting effect for the fluctuation of downward coma by magnification change and downward coma and distortion on the wide angle side will be reduced. Also, the correcting effect for spherical aberration on the telephoto side will be remarkably reduced and the correction thereof will become difficult, and the effect of the aspherical surface will become null. If conversely, the upper limit of conditional expression (5) is exceeded, high-order aberrations will be created, whereby the fluctuation of coma by the fluctuation of the angle of view will be increased and also, the manufacture of the aspherical surface will become difficult.

To make the correction of distortion, upward coma, spherical aberration, etc. at the telephoto end better, it is desirable to introduce an aspherical surface into the fourth lens unit G4 as well. If in that case, the aspherical surface in the fourth lens unit G4 also satisfies conditional expression (5), there can be achieved a zoom lens which has a great aperture and yet has a high performance and suffers very little from distortion.

To accomplish more sufficient aberration correction, it is desirable to satisfy the following conditional expression (6):

$$1.8 \leq f_{G1}/f_W \leq 2.8, \tag{6}$$

where $f_{G1}$: the focal length of the first lens unit G1;

$f_W$: the focal length of the whole system at the wide angle end.

Conditional expression (6) prescribes the appropriate refractive power of the first lens unit G1. If the lower limit of conditional expression (6) is exceeded, the correction of the fluctuations of spherical aberration and downward coma particularly on the telephoto side caused by magnification change will become difficult. Therefore, if an attempt is made to correct the fluctuations of these aberrations, the number of lens components constituting the first lens unit G1 will become great, thus resulting in the bulkiness and increased cost of the lens system, and this is not preferable. If conversely, the upper limit of conditional expression (6) is exceeded, the refractive power of the first lens unit G1 will become weak and the amount of movement of the first lens unit G1 during magnification change will become great. Therefore, the principal ray will pass through the more peripheral portion of the first lens unit G1 on the telephoto side, and this will lead to an increase in the diameter of the fore lens, which in turn results in the bulkiness of the lens system. Thus, the lens barrel holding the lens system will become bulky, and a problem such as eccentricity will make the designing of the lens barrel difficult.

Accordingly, if the design is made such that conditional expression (6) is satisfied, it will become possible to construct the first lens unit G1 of basically three lenses, i.e., a cemented positive lens G11 comprising a positive lens and a negative lens cemented together, and a positive lens G12. Also, the second lens unit G2 is comprised, in succession from the object side, of a negative first lens component G21, a negative second lens component G22, a positive third lens component G23 and a negative fourth lens component G24, and the creation of aberrations such as astigmatism, curvature of image field and distortion at the wide angle end is minimized chiefly by the shapes of the first lens component G21 and the second lens component G22, and the creation of spherical aberration, etc. on the telephoto side is suppressed well chiefly by constructing the third lens component G23 and the fourth lens component G24 into a positive lens and a negative lens, respectively, separate from each other. By thus separating the third lens component G23 and the fourth lens component G24 from each other and providing a slight air gap therebetween, it becomes possible to create aberrations of higher orders and correct spherical aberration well, and this is advantageous for making the relative aperture great.

Also, if at least one of the negative first lens component G21, the negative second lens component G22, the positive third lens component G23 and the negative fourth lens component G24 in the second lens unit G2 is provided by a cemented lens comprising a positive lens and a negative lens cemented together, not only the degree of freedom of the correction of spherical aberration and the correction of chromatic difference of magnification and on-axis chromatic aberration will increase, but also the degree of freedom with which Petzual sum is set to a good value will increase, and a preferable result will be obtained. Further, in that case, it is desirable that the positive lens in the cemented lens be lower is refractive index than the negative lens and the difference in refractive index between these two lenses be 0.1 or greater.

It is also desirable that the third lens unit G3 have a cemented lens therein, and it is preferable for increasing the effect of correcting spherical aberration that the convex surface of the cemented surfaces thereof face the image plane, and if the positive lens in the cemented lens is lower in refractive index than the negative lens and the difference in refractive index between these two lenses is 0.1 or greater, it will be advantageous to set Petzual sum to a more appropriate value. Further, if the third lens unit G3 is made into a construction having two cemented positive lenses, it will be advantageous for the appropriate setting of spherical aberration, on-axis chromatic aberration and Petzual sum. In this case, a greater relative aperture can be expected by the convex surface of the cemented surfaces of each lens component being turned to the image plane.

Also, it is preferable that the fourth lens unit G4 be of a construction basically having four positive, positive, negative and positive components, and as in popular medium telephoto lenses, the ernostar type, the telesonnar type, the modified triplet type or the like, that is suitable for aberration correction. Particularly, the correction of spherical aberration can be accomplished well by the auterior lens in the positive-positive-negative-positive construction.

It is also desirable that for the same reason as that for the third lens unit G3, the fourth lens unit G4 have a cemented lens therein. As in the third lens unit G3, it is desirable that the cemented surfaces of the cemented lens have a convex surface relative to the image plane, and it is desirable that the refractive index of the cemented lens be lower in the positive lens than in the negative lens and the difference in refractive index between these two lenses be 0.05 or greater.

In order to correct upward coma and distortion at the telephoto end, it is desirable that the fourth lens unit G4 have a positive lens component most adjacent to the image side, and by introducing an aspherical surface into that positive lens, it becomes possible to correct distortion and upward coma better.

The first, second and third embodiments of the present invention shown in FIGS. 1, 3 and 5, respectively, have basically the same lens construction and therefore, the specific lens construction of each lens unit will hereinafter be described with the first embodiment of FIG. 1 as a representative.

As shown in FIG. 1, in succession from the object side, the first lens unit G1 is comprised of a cemented positive lens G11 comprising a negative meniscus lens L11N having its convex surface facing the object side and a positive lens L11P cemented together, and a positive meniscus lens G12 having its convex surface facing the object side, the second lens unit G2 is comprised of a negative meniscus lens G21 having its convex surface facing the object side, a cemented negative lens L22 comprising a biconcave negative lens L22N and a positive meniscus lens L22P cemented together, a positive lens G23 and a negative meniscus lens G24 having its concave surface facing the object side, the third lens unit G3 is comprised of a cemented positive lens G31 comprising a bicovex positive lens L31P and a negative meniscus lens L31N having its concave surface facing the object side and cemented together, and a cemented positive lens G32 comprising a biconvex positive lens L32P and a negative meniscus lens L32N having its concave surface facing the object side and cemented together, a stop S being provided immediately forwardly of the third lens unit G3, and the fourth lens unit G4 is comprised of a cemented positive lens G41 comprising a biconvex positive lens L41P and a negative meniscus lens L41N having its concave surface facing the object side and cemented together, a positive lens G42 having its surface of sharper curvature facing the object side, a biconcave negative lens G43 and a biconvex positive lens G44.

Also, during the magnification change from the wide angle end to the telephoto end, as shown in FIGS. 2A–2C, the first lens unit G1 and the fourth lens unit G4 are linked and moved straightly (linearly) toward the object side, the second lens unit G2 is moved non-straightly (non-linearly) toward the image side, and the third lens unit G3 is moved non-straightly (non-linearly) toward the object side.

By such movement of each lens unit for the magnification change from the wide angle end (FIG. 2A) to the telephoto end (FIG. 2C), the air gap between the first lens unit G1 and the second lens unit G2 is increased, the air gap between the second lens unit G2 and the third lens unit G3 is decreased, and the air gap between the third lens unit G3 and the fourth lens unit G4 is decreased, whereby zoom magnification change is effected.

Also, when focusing is to be effected from an infinity object point to a short distance object point, the second lens unit G2 and the third lens unit G3 are moved toward the object side in accordance with a predetermined movement ratio shown in the embodiments.

Different movement ratios may be used for the wide angle end, the middle focal length and the telephoto end, respectively, and for example, in the first embodiment, the movement ratio for focusing differs for the wide angle end (FIG. 2A), the middle focal length state (FIG. 2B) and the telephoto end (FIG. 2C). As previously described, each movement ratio has a movement ratio range conforming to the width of good image like the depth of focus, and the movement ratio range is 0.15–0.33 at the wide angle end, is 0.2–0.3 in the middle focal length state, and is 0.27–0.34 at the telephoto end. Also, in the second embodiment, the movement ratios for focusing are the same for all of the wide angle end (FIG. 4A), the middle focal length state (FIG. 4B) and the telephoto end (FIG. 4C). As previously described, each movement ratio has a movement ratio range conforming to the width of good image, and the movement ratio range is 0.17–0.35 at the wide angle end, is 0.25–0.4 in the middle focal length state, and is 0.27–0.33 at the telephoto end. Further, in the third embodiment, the movement ratios for focusing are the same for the wide angle end (FIG. 6A) and the middle focal length state (FIG. 6B), and differ only for the telephoto end (FIG. 6C). As previously described, each movement ratio has a movement ratio range conforming to the width of good image, and the movement ratio range is 0.2–0.35 at the wide angle end, is 0.2–0.35 in the middle focal length state, and is 0.27–0.34 at the telephoto end.

The numerical data and condition-corresponding numerical values of the respective embodiments of the present invention are given below.

In the tables below, the numbers at the left end represent the order from the object side, r represents the radius of curvature of each lens surface, d represents the spacing between adjacent lens surfaces, $\nu$ represents Abbe number, n represents the refractive index for d line ($\lambda=587.6$ nm), f represents the focal length of the whole system, $F_{NO}$ represents F number, $2\omega$ represents the angle of view, and $\phi$ represents the effective diameters of the aspherical lenses. Also, when the distance, along the direction of the optical axis, from the tangential plane of the vertex of each aspherical surface at a vertical height y from the optical axis is X(h) and the reference paraxial radius of curvature is r and the cone coefficient is k and the nth-order aspherical surface coefficient is Cn, the aspherical surface shown in the values of the numerical data is expressed as $$X(h)=(h^2r)/[1+(1-Kh^2/r^2)^{\frac{1}{2}}]+C2h^2+C4h^4+C6h^6+C8h^8+C10h^{10}.$$

Also, the cone coefficient k and $E^{-n}$ at the left end in the nth-order aspherical surface coefficient indicate $10^{31 n}$. The mark * in the Tables indicates the aspherical surfaces, and the then value of r indicates the paraxial radius of curvature.

TABLE 1

[First Embodiment]

f = 36–102 mm  $F_{NO}$ = F2.9,

TABLE 1-continued

[First Embodiment]

constant $2\omega = 62.8°–23.6°$

| | r | d | $\nu$ | n |
|---|---|---|---|---|
| 1 | 119.429 | 2.50 | 23.8 | 1.84666 |
| 2 | 60.282 | 10.50 | 60.0 | 1.64000 |
| 3 | −349.791 | 0.10 | | |
| 4 | 37.535 | 6.00 | 60.0 | 1.64000 |
| 5 | 60.595 | (d5) | | |
| 6* | 93.483 | 1.50 | 53.9 | 1.71300 |
| 7 | 20.563 | 6.75 | | |
| 8 | −32.214 | 1.60 | 43.3 | 1.84042 |
| 9 | 21.178 | 3.80 | 33.7 | 1.64831 |
| 10 | 74.709 | 0.35 | | |
| 11 | 47.636 | 6.30 | 25.5 | 1.80458 |
| 12 | −24.903 | 0.30 | | |
| 13 | −23.491 | 1.50 | 35.7 | 1.90265 |
| 14 | −141.862 | (d14) | | |
| 15 | 64.219 | 10.00 | 64.1 | 1.51680 |
| 16 | 22.666 | 1.60 | 40.9 | 1.79631 |
| 17 | −67.920 | 0.10 | | |
| 18 | 48.112 | 9.00 | 64.1 | 1.51680 |
| 19 | −37.803 | 1.60 | 35.7 | 1.90265 |
| 20 | −107.302 | (d20) | | |
| 21 | 86.111 | 10.00 | 53.9 | 1.71300 |
| 22 | −26.067 | 1.80 | 40.9 | 1.79631 |
| 23 | −52.027 | 0.10 | | |
| 24 | 35.133 | 6.00 | 60.1 | 1.62041 |
| 25 | 920.837 | 5.05 | | |
| 26 | −49.155 | 1.80 | 43.3 | 1.84042 |
| 27 | 36.265 | 4.30 | | |
| 28* | 70.352 | 3.60 | 64.1 | 1.51680 |
| 29 | −481.467 | (Bf) | | |

| (variable spacings during magnification change) | | | |
|---|---|---|---|
| F | 36.0000 | 60.0000 | 102.0000 |
| D0 | ∞ | ∞ | ∞ |
| d5 | 2.8192 | 14.7415 | 25.5566 |
| d14 | 16.7145 | 9.0918 | 1.9889 |
| d20 | 12.7213 | 8.4218 | 4.7097 |
| Bf | 38.0002 | 46.8973 | 53.9561 |
| $\beta$ | −0.0333 | −0.0333 | −0.0333 |
| D0 | 987.9732 | 1597.9551 | 2397.1251 |
| d5 | 1.5180 | 12.8076 | 21.0254 |
| d14 | 17.7555 | 10.4843 | 5.1607 |
| d20 | 12.9816 | 8.9633 | 6.0691 |
| Bf | 38.0002 | 46.8973 | 53.9561 |

(aspherical surface coefficient of the 6th surface)

k = 0.183962 × 10²
C2 = 0.0000
C4 = 0.33398 × 10⁻⁵
C6 = −0.3611 × 10⁻⁸
C8 = 0.48118 × 10⁻¹¹
C10 = 0.76895 × 10⁻¹³

(aspherical surface coefficient of the 28th surface)

k = −0.145378 × 10²
C2 = 0.0000
C4 = −0.20376 × 10⁻⁵
C6 = 0.71740 × 10⁻⁸
C8 = −0.40200 × 10⁻¹⁰
C10 = 0.10183 × 10⁻¹²

The condition-corresponding numerical values in the above-described embodiment are as follows:

(1) $f_{G2} \cdot h_{G2R}/f_T = -2.19$
(2) $f_{G3} \cdot h_{G3R}/f_T = 9.98$
(3) $f_{G4} \cdot h_{G4F}/f_T = 10.41$
(4) $|X_3/X_2|$ = 0.2 ... wide angle end
  = 0.28 ... middle focal length state
  = 0.3 ... telephoto end
(5) $|AS - S|/f_W$ = 0.0106 ... the aspherical surface which is the 6th surface (when $\phi = 30.2$)

-continued

|   |   |   |
|---|---|---|
| = 0.00598 ... | | the a spherical surface which is the 28th surface (when $\phi = 27.6$) |
| (6) $f_{G1}/f_W = 2.21$ | | |

TABLE 2

[Second Embodiment]

f = 36-102 mm  $F_{NO}$ = F2.9,
constant $2\omega = 62.8°-23.6°$

|   | r | d | ν | n |
|---|---|---|---|---|
| 1 | 119.974 | 2.50 | 23.8 | 1.84666 |
| 2 | 60.149 | 10.50 | 60.0 | 1.64000 |
| 3 | −348.923 | 0.10 | | |
| 4 | 37.372 | 6.00 | 60.0 | 1.64000 |
| 5 | 63.013 | (d5) | | |
| 6* | 83.553 | 1.50 | 53.9 | 1.71300 |
| 7 | 19.738 | 6.75 | | |
| 8 | −31.930 | 1.60 | 43.3 | 1.84042 |
| 9 | 20.195 | 3.80 | 33.7 | 1.64831 |
| 10 | 80.799 | 0.35 | | |
| 11 | 45.342 | 6.30 | 25.5 | 1.80458 |
| 12 | −24.924 | 0.30 | | |
| 13 | −23.841 | 1.50 | 35.7 | 1.90265 |
| 14 | −242.922 | (d14) | | |
| 15 | 92.536 | 10.00 | 64.1 | 1.51680 |
| 16 | −22.482 | 1.60 | 40.9 | 1.79631 |
| 17 | −56.576 | 0.10 | | |
| 18 | 42.872 | 9.00 | 64.1 | 1.51680 |
| 19 | −35.556 | 1.60 | 35.7 | 1.90265 |
| 20 | −100.536 | (d20) | | |
| 21 | 72.267 | 10.00 | 53.9 | 1.71300 |
| 22 | −26.741 | 1.80 | 40.9 | 1.79631 |
| 23 | −54.468 | 0.10 | | |
| 24 | 39.489 | 6.00 | 60.1 | 1.62041 |
| 25 | 747.861 | 5.05 | | |
| 26 | −42.878 | 1.80 | 43.3 | 1.84042 |
| 27 | 40.245 | 4.30 | | |
| 28* | 80.100 | 3.60 | 64.1 | 1.51680 |
| 29 | −179.052 | (Bf) | | |

(variable spacings during magnification change)

| F | 36.0000 | 60.0000 | 102.0000 |
|---|---|---|---|
| D0 | ∞ | ∞ | ∞ |
| d5 | 2.8253 | 14.6910 | 25.1765 |
| d14 | 15.9704 | 8.8152 | 1.9895 |
| d20 | 14.8202 | 10.1098 | 6.4500 |
| Bf | 38.0007 | 46.7900 | 53.7410 |
| β | −0.0333 | −0.0333 | −0.0333 |
| D0 | 991.9076 | 1602.1510 | 2393.1497 |
| d5 | 1.4328 | 12.7976 | 20.7550 |
| d14 | 16.9452 | 10.1406 | 5.0845 |
| d20 | 15.2379 | 10.6778 | 7.7764 |
| Bf | 38.0007 | 46.7900 | 53.7410 |

(aspherical surface coefficient of the 6th surface)

$k = 0.183962 \times 10^2$
$C2 = 0.0000$
$C4 = 0.26631 \times 10^{-5}$
$C6 = 0.17939 \times 10^{-7}$
$C8 = 0.73927 \times 10^{-10}$
$C10 = -0.10574 \times 10^{-12}$ (aspherical surface coefficient of the 28th surface)

$k = -0.238385 \times 10^2$
$C2 = 0.0000$
$C4 = -0.62356 \times 10^{-6}$
$C6 = 0.51236 \times 10^{-8}$
$C8 = -0.29850 \times 10^{-10}$
$C10 = 0.73686 \times 10^{-13}$ The condition-corresponding numerical values in the above-described embodiment are as follows:

(1) $f_{G2} \cdot h_{G2R}/f_T = -2.08$ (2) $f_{G3} \cdot h_{G3R}/f_T = 9.44$
(3) $f_{G4} \cdot h_{G4F}/f_T = 11.15$
(4) $|X_3/X_2|$ = 0.3 ... wide angle end
         = 0.3 ... middle focal length state
         = 0.3 ... telephoto end
(5) $|AS - S|/f_W$ = 0.0814 ... the aspherical surface which is the 6th surface (when $\phi = 29.0$)
         = 0.00520 ... the a spherical surface which is the 28th surface (when $\phi = 28.1$)
(6) $f_{G1}/f_W = 2.14$

TABLE 3

[Third Embodiment]

f = 36-102 mm  $F_{NO}$ = F2.9,
constant $2\omega = 62.8°-23.6°$

|   | r | d | ν | n |
|---|---|---|---|---|
| 1 | 144.113 | 2.50 | 23.8 | 1.84666 |
| 2 | 67.826 | 10.50 | 60.0 | 1.64000 |
| 3 | −364.797 | 0.10 | | |
| 4 | 40.616 | 6.00 | 60.0 | 1.64000 |
| 5 | 75.574 | (d5) | | |
| 6* | 82.175 | 1.50 | 53.9 | 1.71300 |
| 7 | 24.525 | 6.75 | | |
| 8 | −32.141 | 1.60 | 43.3 | 1.84042 |
| 9 | 20.629 | 3.00 | 33.7 | 1.64831 |
| 10 | 45.237 | 0.50 | | |
| 11 | 43.655 | 6.30 | 25.5 | 1.80458 |
| 12 | −23.037 | 0.30 | | |
| 13 | −21.985 | 1.50 | 35.7 | 1.90265 |
| 14 | −143.160 | (d14) | | |
| 15 | 64.067 | 10.00 | 64.1 | 1.51680 |
| 16 | −19.537 | 1.60 | 40.9 | 1.79631 |
| 17 | −88.675 | 0.10 | | |
| 18 | 51.289 | 7.00 | 64.1 | 1.51680 |
| 19 | −53.235 | 1.60 | 33.9 | 1.80384 |
| 20 | −110.016 | (d20) | | |
| 21 | 160.677 | 11.00 | 53.9 | 1.71300 |
| 22 | −24.301 | 1.80 | 40.9 | 1.79631 |
| 23 | −49.907 | 0.50 | | |
| 24 | 32.995 | 7.00 | 60.0 | 1.64000 |
| 25 | −373.760 | 5.45 | | |
| 26 | −49.791 | 1.80 | 43.3 | 1.84042 |
| 27 | 34.181 | 6.10 | | |
| 28* | 62.042 | 3.60 | 60.1 | 1.62041 |
| 29 | −1435.177 | (Bf) | | |

(variable spacings during magnification change)

| F | 36.0000 | 60.0000 | 102.0000 |
|---|---|---|---|
| D0 | ∞ | ∞ | ∞ |
| d5 | 2.8132 | 14.8108 | 25.7954 |
| d14 | 17.0438 | 9.1976 | 1.9860 |
| d20 | 9.2204 | 5.0689 | 1.2960 |
| Bf | 37.9988 | 46.8860 | 54.1834 |
| β | −0.0333 | −0.0333 | −0.0333 |
| D0 | 985.8584 | 1598.3743 | 2393.5693 |
| d5 | 1.1984 | 12.7406 | 20.9971 |
| d14 | 18.1742 | 10.6468 | 5.2008 |
| d20 | 9.7048 | 5.6900 | 2.8794 |
| Bf | 37.9988 | 46.8860 | 54.1834 |

(aspherical surface coefficient of the 6th surface)

$k = 0.183962 \times 10^2$
$C2 = 0.0000$
$C4 = 0.33398 \times 10^{-5}$
$C6 = -0.19602 \times 10^{-9}$
$C8 = -0.78904 \times 10^{-11}$
$C10 = 0.13752 \times 10^{-12}$ (aspherical surface coefficient of the 28th surface)

$k = -0.86563 \times 10$
$C2 = 0.0000$
$C4 = -0.19950 \times 10^{-5}$

TABLE 3-continued

[Third Embodiment]

$C6 = 0.51139 \times 10^{-8}$
$C8 = -0.30096 \times 10^{-10}$
$C10 = 0.68708 \times 10^{-13}$ The condition-corresponding numerical values in the above-described embodiment are as follows:

| | | | |
|---|---|---|---|
| (1) $f_{G2} \cdot h_{G2R}/f_T =$ | $-2.19$ | | |
| (2) $f_{G3} \cdot h_{G3R}/f_T =$ | $11.28$ | | |
| (3) $f_{G4} \cdot h_{G4F}/f_T =$ | $9.48$ | | |
| (4) $\|X_3/X_2\|$ | $= 0.3\ldots$ | | wide angle end |
| | $= 0.3\ldots$ | | middle focal length state |
| | $= 0.33\ldots$ | | telephoto end |
| (5) $\|AS - S\|/f_W$ | $= 0.0133\ldots$ | | the aspherical surface which is the 6th surface (when $\phi = 29.4$) |
| | $= 0.00779\ldots$ | | the aspherical surface which is the 28th surface (when $\phi = 29.65$) |
| (6) $f_{G1}/f_W = 2.26$ | | | |

As can be seen from the numerical data of the respective embodiments, there is achieved a great aperture zoom lens in which each lens unit is comprised of a smallest possible number of lenses, and yet which is relatively compact, in which the diameter of the fore lens is relatively small and the fully open F number is as bright as the order of 2.8, which covers a wide angle of view, and in which the zoom ratio amounts to even 2.83 times.

Of course, in any of the zoom lenses of the above-described embodiments, focusing up to a photo-graphing distance of 0.9-1.0 m is possible and the imaging performance is good.

Also, in the embodiments of the present invention, the second lens unit G2 and the third lens unit G3 or the fourth lens unit G4 can be endowed with the so-called image stabilizing function. Particularly, it is desirable in minimizing the fluctuations of aberrations and simplifying the structure to endow the lens unit movable for focusing and having the focusing function, as in the embodiments of the present invention, for example, the second lens unit G2 or the third lens unit G3, with the image stabilizing function.

Also, in the embodiments of the present invention, the cone coefficient k to the 10th-order term are used as the aspherical surface coefficient in the aspherical surface expression. The introduction of the cone coefficient k affects all of the low-order term to the high-order term and makes fine correction of aberrations possible. The introduction of the cone coefficient particularly into an optical system which requires a high performance like the present invention increases the degree of freedom of designing and enables a more preferable result to be attained.

It is also possible to replace the aspherical lenses in the above-described embodiments by compound type aspherical surfaces of glass and plastic, and the material of the aspherical surfaces is limited in no way.

What is claimed is:

1. A great aperture zoom lens including, in succession from the object side, a first lens unit having positive refractive power, a second lens unit having a negative first lens component, a negative second lens component, a positive third lens component and a negative fourth lens component and having negative refractive power as a whole, a third lens unit having positive refractive power, and a fourth lens unit having positive refractive power, and wherein during the magnification change from the wide angle end to the telephoto end, said second lens unit having negative refractive power is moved toward the image side and said first lens unit, said third lens unit and said fourth lens unit each having positive refractive power are moved toward the object side, said zoom lens being designed to satisfy the following conditions:

$$-3 \leq f_{G2} \cdot h_{G2R}/f_T \leq -1.5$$

$$6 \leq f_{G3} \cdot h_{G3R}/f_T \leq 14$$

$$6 \leq f_{G4} \cdot h_{G4F}/f_T \leq 16,$$

where
$f_{G2}$: the focal length of the second lens unit;
$f_{G3}$: the focal length of the third lens unit;
$f_{G4}$: the focal length of the fourth lens unit;
$h_{G2R}$: the height of rays at the telephoto end from a position at which Rand rays, being rays determining the F number and being rays from the on-axis infinity object point, pass through the outermost margin of a lens surface of the second lens unit which is most adjacent to the image side, to the optical axis;
$h_{G3R}$: the height of rays at the telephoto end from a position at which Rand rays, being rays determining the F number and being rays from the on-axis infinity object point, pass through the outermost margin of a lens surface of the third lens unit which is most adjacent to the image side, to the optical axis;
$h_{G4F}$: the height of rays at the telephoto end from a position at which Rand rays, being rays determining the F number and being rays from the on-axis infinity object point, pass through the outermost margin of a lens surface of the fourth lens unit which is most adjacent to the object side, to the optical axis;
$f_T$: the focal length of the whole system at the telephoto end.

2. A great aperture zoom lens according to claim 1, wherein said second lens unit is further designated to be moved for focusing with at least one other lens unit of said lens units, and when another lens unit moved or focusing with said second lens unit is defined as the nth lens unit, said second lens unit is designed to further satisfy the following condition:

$$0 \leq |X_n/X_2| \leq 0.9,$$

where
$X_2$: the amount of movement of the second lens unit during short distance focusing;
$X_n$: the amount of movement of the nth lens unit during short distance focusing.

3. A great aperture zoom lens according to claim 1, wherein said second lens unit has an aspherical surface, and when the difference, in the direction of the optical axis at the outermost periphery, between the effective diameters of said aspherical surface and a reference spherical surface having a predetermined vertex radius of curvature is (AS−S), and the focal length of the whole system at the wide angle end is $f_W$, said second lens unit is designed to satisfy the following condition:

$$0.001 \leq |AS-S|/f_W \leq 0.03.$$

4. A great aperture zoom lens according to claim 1, wherein when the focal length of said first lens unit is $f_{G1}$ and the focal length of the whole system at the wide angle end is $f_W$ said first lens unit is designed to satisfy the following condition:

$$1.8 \leq f_{G1}/f_W \leq 2.8.$$

5. A great aperture zoom lens according to claim 1, wherein at least one of said four lens components in said second lens unit comprises a cemented lens comprising a positive lens and a negative lens cemented together, and when the refractive index of the positive lens of said cemented lens for d line ($\lambda = 587.6$ nm) is $n_P$ and the refractive index of the negative lens for d line is $n_N$, said cemented lens is designed to satisfy the following condition:

$$n_N - n_P > 0.1.$$

6. A great aperture zoom lens according to claim 1, wherein said third lens unit has at least one cemented lens having positive refractive power and comprising a positive lens and a negative lens cemented together and having a convex cemented surface on the image side, and when the refractive index of the positive lens of said cemented lens for d line ($\lambda = 587.6$ nm) is $n_P$ and the refractive index of the negative lens for d line is $n_N$, said cemented lens is designed to satisfy the following condition:

$$n_N - n_P > 0.1.$$

7. A great aperture zoom lens according to claim 1, wherein said fourth lens unit comprises four lens components and has positive refractive power as a whole, said four lens components including, in succession from the object side, a first lens component having positive refractive power, a second lens component having positive refractive power, a third lens component having negative refractive power, and a fourth lens component having positive refractive power, and at least one of said four lens components comprises a cemented lens comprising a positive lens and a negative lens cemented together, and when the refractive index of the positive lens of said cemented lens for d line ($\lambda = 587.6$ nm) is $n_P$ and the refractive index of the negative lens for d line is $n_N$, said cemented lens is designed to satisfy the following condition:

$$n_N - n_P < 0.05.$$

8. A great aperture zoom lens according to claim 1, wherein said zoom lens is designed to further satisfy the following conditions:

$$-3 \leq f_{G2} \cdot h_{G2R}/f_T \leq -1.8$$

$$8.6 \leq f_{G3} \cdot h_{G3R}/f_T \leq 14$$

$$8 \leq f_{G4} \cdot h_{G4F}/f_T \leq 12.$$

9. A great aperture zoom lens according to claim 2, wherein said second lens unit is designed to further satisfy the following condition:

$$0 < |X_n/X_2| \leq 0.6.$$

10. A great aperture zoom lens according to claim 1, wherein in succession from the object side, said first lens unit comprises a cemented lens having positive refractive power and comprising a negative meniscus lens having its convex surface facing the object side and a positive lens cemented together, and a positive meniscus lens having its convex surface facing the object side, said second lens unit comprises a negative meniscus lens having its convex surface facing the object side, a cemented lens having negative refractive power and comprising a biconcave negative lens and a positive meniscus lens cemented together, a positive lens and a negative meniscus lens having its concave surface facing the object side, said third lens unit comprises two cemented lenses having positive refractive power and each comprising a biconvex positive lens and a negative meniscus lens having its concave surface facing the object image cemented together, said fourth lens unit comprises a cemented lens having positive refractive power and comprising a convex positive lens and a negative meniscus lens having its concave surface facing the object side cemented together, a positive lens having its convex surface of sharper curvature facing the object side, a biconcave negative lens and a biconvex positive lens, and a stop is provided near a lens surface of said third lens unit which is most adjacent to the object side.

11. A great aperture zoom lens including, in succession from the object side, a first lens unit having positive refractive power, a second lens unit having negative refractive power, a third lens unit having positive refractive power, and a fourth lens unit having positive refractive power, said first lens unit, said second lens unit, said third lens unit and said fourth lens unit being movable for magnification change so as to change the spacing between adjacent ones thereof, and further, only said second lens unit and said third lens unit being movable for focusing.

12. A great aperture zoom lens according to claim 11, wherein said second lens unit and said third lens unit are designed to be moved for focusing by different amounts of movement depending on the focal length of the whole system.

13. A great aperture zoom lens according to claim 12, wherein said second lens unit and said third lens unit are movable for focusing at any focal length of the whole system so as to satisfy the following condition:

$$0 < |X_3/X_2| \leq 0.9,$$

where
$X_2$: the amount of movement of the second lens unit during short distance focusing;
$X_3$: the amount of movement of the third lens unit during short distance focusing.

14. A great aperture zoom lens according to claim 11, wherein said second lens unit, said third lens unit and said fourth lens unit are designed to satisfy the following conditions:

$$-3 \leq f_{G2} \cdot h_{G2R}/f_T \leq -1.5$$

$$6 \leq f_{G3} \cdot h_{G3R}/f_T \leq 14$$

$$6 \leq f_{G4} \cdot h_{G4F}/f_T \leq 16,$$

where
- $f_{G2}$: the focal length of the second lens unit;
- $f_{G3}$: the focal length of the third lens unit;
- $f_{G4}$: the focal length of the fourth lens unit;
- $h_{G2R}$: the height of rays at the telephoto end from a position at which Rand rays, being rays determining the F number and being rays from the on-axis infinity object point, pass through the outermost margin of a lens surface of the second lens unit which is most adjacent to the image side, to the optical axis;
- $h_{G3R}$: the height of rays at the telephoto end from a position at which Rand rays, being rays determining the F number and being rays from the on-axis infinity object point, pass through the outermost margin of a lens surface of the third lens unit which is most adjacent to the image side, to the optical axis;
- $h_{G4F}$: the height of rays at the telephoto end from a position at which Rand rays, being rays determining the F number and being rays from the on-axis infinity object point, pass through the outermost margin of a lens surface of the fourth lens unit which is most adjacent to the object side, to the optical axis;
- $f_T$: the focal length of the whole system at the telephoto end.

15. A great aperture zoom lens according to claim 11, wherein said second lens unit has an aspherical surface, and when the difference, in the direction of the optical axis at the outermost periphery, between the effective diameters of said aspherical surface and a reference spherical surface having a predetermined vertex radius of curvature is (AS−S), and the focal length of the whole system at the wide angle end is $f_W$, said second lens unit is designed to satisfy the following condition:

$$0.001 \leq |AS-S|/f_W \leq 0.03.$$

16. A great aperture zoom lens according to claim 11, wherein when the focal length of said first lens unit is $f_{G1}$ and the focal length of the whole system at the wide angle end is $f_W$, said first lens unit is designed to satisfy the following condition:

$$1.8 \leq f_{G1}/f_W \leq 2.8.$$

17. A great aperture zoom lens according to claim 11, wherein said second lens unit comprises four lens components and has negative refractive power as a whole, said four lens components including, in succession from the object side, a first lens component having negative refractive power, a second lens component having negative refractive power, a third lens component having positive refractive power and a fourth lens component having negative refractive power, and said third lens unit is comprised of two positive lens components.

18. A great aperture zoom lens according to claim 17, wherein at least one of said four lens components in said second lens unit comprises a cemented lens comprising a positive lens and a negative lens cemented together, and when the refractive index of the positive lens of said cemented lens for d line ($\lambda=587.6$ nm) is $n_P$ and the refractive index of the negative lens for d line is $n_N$, said cemented lens is designed to satisfy the following condition:

$$n_N - n_P > 0.1.$$

19. A great aperture zoom lens according to claim 11, wherein said third lens unit has at least one cemented lens having positive refractive power and comprising a positive lens and a negative lens cemented together and having a convex cemented surface on the image side, and when the refractive index of the positive lens of said cemented lens for d line ($\lambda=587.6$ nm) is $n_P$ and the refractive index of the negative lens for d line is $n_N$, said cemented lens is designed to satisfy the following condition:

$$n_N - n_P > 0.1.$$

20. A great aperture zoom lens according to claim 11, wherein said fourth lens unit comprises four lens components and has positive refractive power as a whole, said four lens components including, in succession from the object side, a first lens component of positive refractive power, a second lens component of positive refractive power, a third lens component of negative refractive power, and a fourth lens component of positive refractive power, at least one of said four lens components comprises a cemented lens comprising a positive lens and a negative lens cemented together, and when the refractive index of the positive lens of said cemented lens for d line ($\lambda=587.6$ nm) is $n_P$ and the refractive index of the negative lens for d line is $n_N$, said cemented lens is designed to satisfy the following condition:

$$n_N - n_P > 0.05.$$

21. A great aperture zoom lens according to claim 13, wherein said second lens unit and said third lens unit are designed to satisfy the following condition for focusing at any focal length of the whole system:

$$0 < |X_3/X_2| \leq 0.6.$$

22. A great aperture zoom lens according to claim 11, wherein in succession from the object side, said first lens unit comprises a cemented lens having positive refractive power and comprising a negative meniscus lens having its convex surface facing the object side and a positive lens cemented together, and a positive meniscus lens having its convex surface facing the object side, said second lens unit comprises a negative meniscus lens having its convex surface facing the object side, a cemented lens having negative refractive power and comprising a biconcave negative lens and a positive meniscus lens cemented together, a positive lens and a negative meniscus lens having its concave surface facing the object side, said third lens unit comprises two cemented lenses having positive refractive power and each comprising a biconvex positive lens and a negative meniscus lens having its concave surface facing the object side cemented together, said fourth lens unit comprises a cemented lens having positive refractive power and comprising a biconvex positive lens and a negative meniscus lens having its concave surface facing the object side cemented together, a positive lens having its convex surface of sharper curvature facing the object side, a biconcave negative lens and a biconvex positive lens, and a stop is provided near a lens surface of said third lens unit which is most adjacent to the object side.

23. A great aperture zoom lens according to claim 1, designed in accordance with the following data:

| f = 36–102 mm $F_{NO}$ = F2.9, constant $2\omega$ = 62.8°–23.6° | | | | |
|---|---|---|---|---|
| | r | d | $\nu$ | n |
| 1 | 119.429 | 2.50 | 23.8 | 1.84666 |
| 2 | 60.282 | 10.50 | 60.0 | 1.64000 |
| 3 | −349.791 | 0.10 | | |
| 4 | 37.535 | 6.00 | 60.0 | 1.64000 |
| 5 | 60.595 | (d5) | | |
| 6* | 93.483 | 1.50 | 53.9 | 1.71300 |
| 7 | 20.563 | 6.75 | | |
| 8 | −32.214 | 1.60 | 43.3 | 1.84042 |
| 9 | 21.178 | 3.80 | 33.7 | 1.64831 |
| 10 | 74.709 | 0.35 | | |
| 11 | 47.636 | 6.30 | 25.5 | 1.80458 |
| 12 | −24.903 | 0.30 | | |
| 13 | −23.491 | 1.50 | 35.7 | 1.90265 |
| 14 | −141.862 | (d14) | | |
| 15 | 64.219 | 10.00 | 64.1 | 1.51680 |
| 16 | −22.666 | 1.60 | 40.9 | 1.79631 |
| 17 | −67.920 | 0.10 | | |
| 18 | 48.112 | 9.00 | 64.1 | 1.51680 |
| 19 | −37.803 | 1.60 | 35.7 | 1.90265 |
| 20 | −107.302 | (d20) | | |
| 21 | 86.111 | 10.00 | 53.9 | 1.71300 |
| 22 | −26.067 | 1.80 | 40.9 | 1.79631 |
| 23 | −52.027 | 0.10 | | |
| 24 | 35.133 | 6.00 | 60.1 | 1.62041 |
| 25 | 920.837 | 5.05 | | |
| 26 | −49.155 | 1.80 | 43.3 | 1.84042 |
| 27 | 36.265 | 4.30 | | |
| 28* | 70.352 | 3.60 | 64.1 | 1.51680 |
| 29 | −481.467 | (Bf) | | |

| (variable spacings during magnification change) | | | |
|---|---|---|---|
| F | 36.0000 | 60.0000 | 102.0000 |
| D0 | ∞ | ∞ | ∞ |
| d5 | 2.8192 | 14.7415 | 25.5566 |
| d14 | 16.7145 | 9.0918 | 1.9889 |
| d20 | 12.7213 | 8.4218 | 4.7097 |
| Bf | 38.0002 | 46.8973 | 53.9561 |
| $\beta$ | −0.0333 | −0.0333 | −0.0333 |
| D0 | 987.9732 | 1597.9551 | 2397.1251 |
| d5 | 1.5180 | 12.8076 | 21.0254 |
| d14 | 17.7555 | 10.4843 | 5.1607 |
| d20 | 12.9816 | 8.9633 | 6.0691 |
| Bf | 38.0002 | 46.8973 | 53.9561 |

(aspherical surface coefficient of the 6th surface)

$k = 0.183962 \times 10^2$
$C2 = 0.0000$
$C4 = 0.33398 \times 10^{-5}$
$C6 = -0.3611 \times 10^{-8}$
$C8 = 0.48118 \times 10^{-11}$
$C10 = 0.76895 \times 10^{-13}$ (aspherical surface coefficient of the 28th surface)

$k = -0.145378 \times 10^2$
$C2 = 0.0000$
$C4 = -0.20376 \times 10^{-5}$
$C6 = 0.71740 \times 10^{-8}$
$C8 = -0.40200 \times 10^{-10}$
$C_{10} = 0.10183 \times 10^{-12}$ the condition-corresponding numerical values are as follows:

(1) $f_{G2} \cdot h_{G2R}/f_T = -2.19$
(2) $f_{G3} \cdot h_{G3R}/f_T = 9.98$
(3) $f_{G4} \cdot h_{G4F}/f_T = 10.41$
(4) $|X_3/X_2|$ = 0.2... wide angle end
          = 0.28... middle focal length state
(5) $|AS - S|/f_W$ = 0.3... telephoto end
         = 0.0106... aspherical surface which is the 6th surface (when $\phi$ = 30.2)
         = 0.00598... aspherical surface which is the 28th surface (when $\phi$ = 27.6)
(6) $f_{G1}/f_W = 2.21$ in the foregoing, the numbers at the left end represent the order from the object side, r represents the radius of curvature of each lens surface, d represents the spacing between adjacent lens surfaces, $\nu$ represents Abbe number, n represents the refractive index for d line ($\lambda$=587.6 nm), f represents the focal length of the whole system, $F_{NO}$ represents F number, $2\omega$ represents the angle of view, and $\phi$ represents the effective diameters of the aspherical lenses, also, when the distance, along the direction of the optical axis, from the tangential plane of the vertex of each aspherical surface at a vertical height y from the optical axis is X(h) and the reference paraxial radius of curvature is r and the cone coefficient is k and the nth-order aspherical surface coefficient is Cn, the aspherical surface shown in the values of the numerical data is expressed as $$X(h) = (h^2/r)/[1+(1-Kh^2/r^2)^{\frac{1}{2}}] + C2h^2 + C4h^4 + C6h^6 + C8h^8 + C10h^{10},$$

also, the cone coefficient k, and $E^{-n}$ at the left end in the nth-order aspherical surface coefficient Cn indicate $10^{-n}$, the mark * in the table above indicates the aspherical surfaces, and the then value of r indicates the paraxial radius of curvature;

$f_{G2}$: the focal length of the second lens unit;
$f_{G3}$: the focal length of the third lens unit;
$f_{G4}$: the focal length of the fourth lens unit;
$h_{G2R}$: the height of rays at the telephoto end from a position at which R and rays determining the F number from the on-axis infinity object point pass through the outermost margin of that lens surface of the second lens unit which is most adjacent to the image side to the optical axis;
$h_{G3R}$: the height of rays at the telephoto end from a position at which the R and rays determining the F number from the on-axis infinity object point pass through the outermost margin of that lens surface of the third lens unit which is most adjacent to the image side to the optical axis;
$h_{G4F}$: the height of rays at the telephoto end from a position at which the R and rays determining the F number from the on-axis infinity object point pass through the outermost margin of that lens surface of the fourth lens unit which is most adjacent to the object side to the optical axis;
$f_T$: the focal length of the whole system at the telephoto end;
$X_2$: the amount of movement of the second lens unit during short distance focusing;
$X_3$: the amount of movement of the third lens unit during short distance focusing;
(AS−S): the difference, in the direction of the optical axis on the outermost periphery, between the effective diameters of the aspherical surface and a reference spherical surface having a predetermined vertex radius of curvature;

$f_{G1}$: the focal length of the first lens unit;
$f_w$: the focal length of the whole system at the wide angle end.

24. A great aperture zoom lens according to claim 1, designed in accordance with the following data;

| | f = 36–102 mm | $F_{NO}$ = F2.9, constant 2ω = 62.8°–23.6° | | |
|---|---|---|---|---|
| | r | d | ν | n |
| 1 | 119.974 | 2.50 | 23.8 | 1.84666 |
| 2 | 60.149 | 10.50 | 60.0 | 1.64000 |
| 3 | −348.923 | 0.10 | | |
| 4 | 37.372 | 6.60 | 60.0 | 1.64000 |
| 5 | 63.013 | (d5) | | |
| 6* | 83.553 | 1.50 | 53.9 | 1.71300 |
| 7 | 19.738 | 6.75 | | |
| 8 | −31.930 | 1.60 | 43.3 | 1.84042 |
| 9 | 20.195 | 3.80 | 33.7 | 1.64831 |
| 10 | 80.799 | 0.35 | | |
| 11 | 45.342 | 6.30 | 25.5 | 1.80458 |
| 12 | −24.924 | 0.30 | | |
| 13 | −23.841 | 1.50 | 35.7 | 1.90265 |
| 14 | −242.922 | (d14) | | |
| 15 | 92.536 | 10.00 | 64.1 | 1.51680 |
| 16 | −22.482 | 1.60 | 40.9 | 1.79631 |
| 17 | −56.576 | 0.10 | | |
| 18 | 42.872 | 9.00 | 64.1 | 1.51680 |
| 19 | −35.556 | 1.60 | 35.7 | 1.90265 |
| 20 | −100.536 | (d20) | | |
| 21 | 72.267 | 10.00 | 53.9 | 1.71300 |
| 22 | −26.741 | 1.80 | 40.9 | 1.79631 |
| 23 | −54.468 | 0.10 | | |
| 24 | 39.489 | 6.00 | 60.1 | 1.62041 |
| 25 | 747.861 | 5.05 | | |
| 26 | −42.878 | 1.80 | 43.3 | 1.84042 |
| 27 | 40.245 | −4.30 | | |
| 28* | 80.100 | 3.60 | 64.1 | 1.51680 |
| 29 | −179.052 | (Bf) | | |

| (variable spacings during magnification change) | | | |
|---|---|---|---|
| F | 36.0000 | 60.0000 | 102.0000 |
| D0 | ∞ | ∞ | ∞ |
| d5 | 2.8253 | 14.6910 | 25.1765 |
| d14 | 15.9704 | 8.8152 | 1.9895 |
| d20 | 14.8202 | 10.1098 | 6.4500 |
| Bf | 38.0007 | 46.7900 | 53.7410 |
| β | −0.0333 | −0.0333 | −0.0333 |
| D0 | 991.9076 | 1602.1510 | 2393.1497 |
| d5 | 1.4328 | 12.7976 | 20.7550 |
| d14 | 16.9452 | 10.1406 | 5.0845 |
| d20 | 15.2379 | 10.6778 | 7.7764 |
| Bf | 38.0007 | 46.7900 | 53.7410 |

(aspherical surface coefficient of the 6th surface)

k = 0.183962 × 10²
C2 = 0.0000
C4 = 0.26631 × 10⁻⁵
C6 = −0.17939 × 10⁻⁷
C8 = 0.73927 × 10⁻¹⁰
C10 = −0.10574 × 10⁻¹²

(aspherical surface coefficient of the 28th surface)

K = −0.238385 × 10²
C2 = 0.0000
C4 = −0.62356 × 10⁻⁶
C6 = 0.51236 × 10⁻⁸
C8 = −0.29850 × 10⁻¹⁰
C10 = 0.73686 × 10⁻¹³ the condition-corresponding numerical values are as follows:

| | | |
|---|---|---|
| (1) $f_{G2} \cdot h_{G2R}/f_T$ = | −2.08 | |
| (2) $f_{G3} \cdot h_{G3R}/f_T$ = | 9.44 | |
| (3) $f_{G4} \cdot h_{G4F}/f_T$ = | 11.15 | |
| (4) $\|X_3/X_2\|$ = | 0.3 ... | wide angle end |
| = | 0.3 ... | middle focal length state |
| = | 0.3 ... | telephoto end |
| (5) $\|AS − S\|/f_W$ = | 0.00814 ... | aspherical surface which is the 6th surface (when φ = 29.0) |
| = | 0.00520 ... | aspherical surface which is the 28th surface (when φ = 28.1) |
| (6) $f_{G1}/f_W$ = 2.14 | | | in the foregoing, the numbers at the left end represent the order from the object side, r represents the radius of curvature of each lens surface, d represents the spacing between adjacent lens surfaces, ν represents Abbe number, n represents the refractive index for d line (λ=587.6 nm), f represents the focal length of the whole system, $F_{NO}$ represents F number, 2ω represents the angle of view, and φ represents the effective diameters of the aspherical lenses, also, when the distance, along the direction of the optical axis, from the tangential plane of the vertex of each aspherical surface at a vertical height y from the optical axis is X(h) and the reference paraxial radius of curvature is r and the cone coefficient is k and the nth-order aspherical surface coefficient is Cn, the aspherical surface shown in the values of the numerical data is expressed as $$X(h) = (h^2/r)/[1+(1-Kh^2/r^2)^{\frac{1}{2}}] + C2h^2 + C4h^4 + C6h^6 + C8h^8 + C10h^{10},$$

also, the cone coefficient k and $E^{-n}$ at the left end in the nth-order aspherical surface coefficient Cn indicate $10^{-n}$, the mark * in the table above indicates the aspherical surfaces, and the then value of r indicates the paraxial radius of curvature;

$f_{G2}$: the focal length of the second lens unit;
$f_{G3}$: the focal length of the third lens unit;
$f_{G4}$: the focal length of the fourth lens unit;
$h_{G2R}$: the height of rays at the telephoto end from a position at which R and rays determining the F number from the on-axis infinity object point pass through the outermost margin of that lens surface of the second lens unit which is most adjacent to the image side to the optical axis;
$h_{G3R}$: the height of rays at the telephoto end from a position at which the R and rays determining the F number from the on-axis infinity object point pass through the outermost margin of that lens surface of the third lens unit which is most adjacent to the image side to the optical axis;
$h_{G4F}$: the height of rays at the telephoto end from a position at which the R and rays determining the F number from the on-axis infinity object point pass through the outermost margin of that lens surface of the fourth lens unit which is most adjacent to the object side to the optical axis;
$f_T$: the focal length of the whole system at the telephoto end;
$X_2$: the amount of movement of the second lens unit during short distance focusing;
$X_3$: the amount of movement of the third lens unit during short distance focusing;
(AS−S): the difference, in the direction of the optical axis on the outermost periphery, between the effective diameters of the aspherical surface and a reference spherical surface having a predetermined vertex radius of curvature;

$f_{G1}$: the focal length of the first lens unit;

$f_W$: the focal length of the whole system at the wide angle end.

25. A great aperture zoom lens according to claim 1, designed in accordance with the following data:

| f = 36–102 mm $F_{NO}$ = F2.9, constant 2ω = 62.8°–23.6° | | | |
|---|---|---|---|
| r | d | ν | n |
| 1 | 144.133 | 2.50 | 23.8 | 1.84666 |
| 2 | 67.826 | 10.50 | 60.0 | 1.64000 |
| 3 | −364.797 | 0.10 | | |
| 4 | 40.616 | 6.00 | 60.0 | 1.64000 |
| 5 | 75.574 | (d5) | | |
| 6* | 82.175 | 1.50 | 53.9 | 1.71300 |
| 7 | 24.525 | 6.75 | | |
| 8 | −32.141 | 1.60 | 43.3 | 1.84042 |
| 9 | 20.629 | 3.00 | 33.7 | 1.64831 |
| 10 | 45.237 | 0.50 | | |
| 11 | 43.655 | 6.30 | 25.5 | 1.80458 |
| 12 | −23.037 | 0.30 | | |
| 13 | −21.985 | 1.50 | 35.7 | 1.90265 |
| 14 | −143.160 | (d14) | | |
| 15 | 64.067 | 10.00 | 64.1 | 1.51680 |
| 16 | −19.537 | 1.60 | 40.9 | 1.79631 |
| 17 | −88.675 | 0.10 | | |
| 18 | 51.289 | 7.00 | 64.1 | 1.51680 |
| 19 | −53.235 | 1.60 | 33.9 | 1.80384 |
| 20 | −110.016 | (d20) | | |
| 21 | 160.677 | 11.00 | 53.9 | 1.71300 |
| 22 | −24.301 | 1.80 | 40.9 | 1.79631 |
| 23 | −49.907 | 0.50 | | |
| 24 | 32.995 | 7.00 | 60.0 | 1.64000 |
| 25 | −373.760 | 5.45 | | |
| 26 | −49.791 | 1.80 | 43.3 | 1.84042 |
| 27 | 34.181 | 6.10 | | |
| 28* | 62.042 | 3.60 | 60.1 | 1.62041 |
| 29 | −1435.177 | (Bf) | | |

| (variable spacings during magnification change) | | | |
|---|---|---|---|
| F | 36.0000 | 60.0000 | 102.0000 |
| D0 | ∞ | ∞ | ∞ |
| d5 | 2.8132 | 14.8108 | 25.7954 |
| d14 | 17.0438 | 9.1976 | 1.9860 |
| d20 | 9.2204 | 5.0689 | 1.2960 |
| Bf | 37.9988 | 46.8860 | 54.1834 |
| β | −0.0333 | −0.0333 | −0.0333 |
| D0 | 985.8584 | 1598.3743 | 2393.5693 |
| d5 | 1.1984 | 12.7406 | 20.9971 |
| d14 | 18.1742 | 10.6468 | 5.2008 |
| d20 | 9.7048 | 5.6900 | 2.8794 |
| Bf | 37.9988 | 46.8860 | 54.1834 |

(aspherical surface coefficient of the 6th surface)

k = 0.183962 × 10
C2 = 0.0000
C4 = 0.33398 × 10⁻⁵
C6 = −0.19602 × 10⁻⁹
C8 = −0.78904 × 10⁻¹¹
C10 = 0.13752 × 10⁻¹²

(aspherical surface coefficient of the 28th surface)

k = −0.86563 × 10²
C2 = 0.0000
C4 = −0.19950 × 10⁻⁵
C6 = 0.51139 × 10⁻⁸
C8 = −0.30096 × 10⁻¹⁰
C10 = 0.68708 × 10⁻¹³ the condition-corresponding numerical values are as follows:

(1) $f_{G2} \cdot h_{G2R}/f_T$ = −2.19
(2) $f_{G3} \cdot h_{G3R}/f_T$ = 11.28
(3) $f_{G4} \cdot h_{G4F}/f_T$ = 9.48
(4) $|X_3/X_2|$ = 0.3 ... wide angle end
  = 0.3 ... middle focal length
  = 0.33 ... telephoto end state
(5) $|AS - S|/f_W$ = 0.0133 ... aspherical surface which is the 6th surface (when φ = 29.4)
  = 0.00779 ... aspherical surface which is the 28th surface (when φ = 29.65)
(6) $f_{G1}/f_W$ = 2.26 in the foregoing, the numbers at the left end represent the order from the object side, r represents the radius of curvature of each lens surface, d represents the spacing between adjacent lens surfaces, ν represents Abbe number, n represents the refractive index for d line (λ=587.6 nm), f represents the focal length of the whole system, $F_{NO}$ represents F number, 2ω represents the angle of view, and φ represents the effective diameters of the aspherical lenses, also, when the distance, along the direction of the optical axis, from the tangential plane of the vertex of each aspherical surface at a vertical height y from the optical axis is X(h) and the reference paraxial radius of curvature is r and the cone coefficient is k and the nth-order aspherical surface coefficient is Cn, the aspherical surface shown in the values of the numerical data is expressed as $$X(h) = (h^2/r)/[1+(1-kh^2/r^2)^{\frac{1}{2}}] + C2h^2 + C4h^4 + C6h^6 + C8h^8 + C10h^{10},$$

also, the cone coefficient k and $E^{-n}$ at the left end in the nth-order aspherical surface coefficient Cn indicate $10^{-n}$, the mark * in the table above indicates the aspherical surfaces, and the then value of r indicates the paraxial radius of curvature;

$f_{G2}$: the focal length of the second lens unit;

$f_{G3}$: the focal length of the third lens unit;

$f_{G4}$: the focal length of the fourth lens unit;

$h_{G2R}$: the height of rays at the telephoto end from a position at which R and rays determining the F number from the on-axis infinity object point pass through the outermost margin of that lens surface of the second lens unit which is most adjacent to the image side to the optical axis;

$h_{G3R}$: the height of rays at the telephoto end from a position at which the R and rays determining the F number from the on-axis infinity object point pass through the outermost margin of that lens surface of the third lens unit which is most adjacent to the image side to the optical axis;

$h_{G4F}$: the height of rays at the telephoto end from a position at which the R and rays determining the F number from the on-axis infinity object point pass through the outermost margin of that lens surface of the fourth lens unit which is most adjacent to the object side to the optical axis;

$f_T$: the focal length of the whole system at the telephoto end;

$X_2$: the amount of movement of the second lens unit during short distance focusing;

$X_3$: the amount of movement of the third lens unit during short distance focusing;

(AS−S): the difference, in the direction of the optical axis on the outermost periphery, between the effective diameters of the aspherical surface and a reference spherical surface having a predetermined vertex radius of curvature;

$f_{G1}$: the focal length of the first lens unit;

$f_W$: the focal length of the whole system at the wide angle end.

* * * * *